US008384928B2

(12) United States Patent
Nemoto

(10) Patent No.: US 8,384,928 B2
(45) Date of Patent: Feb. 26, 2013

(54) IMAGE FORMING APPARATUS, METHOD OF CONTROLLING SAME AND CONTROL PROGRAM

(75) Inventor: Junko Nemoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1233 days.

(21) Appl. No.: 11/442,052

(22) Filed: May 26, 2006

(65) Prior Publication Data

US 2006/0274353 A1 Dec. 7, 2006

(30) Foreign Application Priority Data

Jun. 7, 2005 (JP) ................................ 2005-167342

(51) Int. Cl.
*G06F 3/12* (2006.01)
(52) U.S. Cl. ......... 358/1.15; 705/404; 709/202; 710/20; 708/105
(58) Field of Classification Search .................. 358/1.15; 705/9, 20, 21, 301, 400, 401, 403, 404, 410; 709/201, 202, 203, 232, 238; 710/20, 21; 708/105, 110
See application file for complete search history.

(56) References Cited

U.S. PATENT DOCUMENTS

| | | | | |
|---|---|---|---|---|
| 4,947,345 A | * | 8/1990 | Paradise et al. | 358/442 |
| 6,385,675 B1 | * | 5/2002 | Yamaguchi | 710/72 |
| 6,661,527 B1 | * | 12/2003 | Shibao | 358/1.13 |
| 7,124,094 B1 | * | 10/2006 | Kobayashi et al. | 705/26 |
| 7,145,678 B2 | * | 12/2006 | Simpson et al. | 358/1.15 |
| 7,266,590 B2 | * | 9/2007 | Nakaoka et al. | 709/219 |
| 7,370,090 B2 | * | 5/2008 | Nakaoka et al. | 709/219 |
| 7,461,138 B2 | * | 12/2008 | Mukaiyama et al. | 709/219 |
| 7,509,676 B2 | * | 3/2009 | Trueba | 726/22 |
| 7,567,360 B2 | * | 7/2009 | Takahashi et al. | 358/1.15 |
| 7,870,287 B2 | * | 1/2011 | Nakaoka et al. | 709/238 |
| 7,953,818 B2 | * | 5/2011 | Chang et al. | 709/217 |
| 8,054,494 B2 | * | 11/2011 | Takahashi et al. | 358/1.15 |
| 2001/0034747 A1 | * | 10/2001 | Fujitani et al. | 707/525 |

(Continued)

FOREIGN PATENT DOCUMENTS

| | | |
|---|---|---|
| JP | 10-020957 | 1/1998 |
| JP | 11-305968 | 11/1999 |

(Continued)

OTHER PUBLICATIONS

The above references were cited in a Jun. 26, 2009 Japanese Office Action that issued in Japanese Patent Application No. 2006-144684, without English Translation.

*Primary Examiner* — Negussie Worku
(74) *Attorney, Agent, or Firm* — Cowan, Liebowitz & Latman, P.C.

(57) ABSTRACT

Disclosed is an image forming apparatus in which even in the event that a print job is suspended by reason of payment of an insufficient fee, image formation continues effectively and appropriately. The image forming apparatus, which charges for image formation processing, has determination means for determining whether or not a fee necessary in order to execute a specified print job has been received; printing suspension means for suspending the print job if the determination means has determined that a fee received is insufficient; and authentication means for authenticating user information during suspension of printing. The apparatus further includes printing control means for saving data relating to the suspended print job and accepting a print job from a different user if use of user information that is identical with user information of the suspended print job has not been sensed by the authentication means.

8 Claims, 6 Drawing Sheets

U.S. PATENT DOCUMENTS

| | | | |
|---|---|---|---|
| 2002/0001099 A1* | 1/2002 | Okuda et al. | 358/1.15 |
| 2002/0078275 A1* | 6/2002 | Yamaguchi | 710/72 |
| 2002/0131079 A1* | 9/2002 | Forbes et al. | 358/1.15 |
| 2002/0171859 A1* | 11/2002 | Chen et al. | 358/1.14 |
| 2003/0020944 A1* | 1/2003 | Bhogal et al. | 358/1.15 |
| 2003/0090705 A1* | 5/2003 | Ferlitsch | 358/1.15 |
| 2003/0093670 A1* | 5/2003 | Matsubayashi et al. | 713/168 |
| 2003/0120954 A1* | 6/2003 | Sugiyama | 713/201 |
| 2005/0065894 A1* | 3/2005 | Inaba | 705/400 |
| 2005/0105117 A1* | 5/2005 | Oh et al. | 358/1.13 |
| 2005/0232595 A1* | 10/2005 | Hirai | 386/94 |
| 2006/0001898 A1* | 1/2006 | Maeshima et al. | 358/1.14 |
| 2006/0070071 A1* | 3/2006 | Shimizu et al. | 718/100 |
| 2006/0198653 A1* | 9/2006 | Plewnia et al. | 399/79 |
| 2007/0035763 A1* | 2/2007 | Bard et al. | 358/1.15 |

FOREIGN PATENT DOCUMENTS

| | | |
|---|---|---|
| JP | 2000-250730 | 9/2000 |
| JP | 2001-075751 | 3/2001 |
| JP | 2001-256025 | 9/2001 |
| JP | 2003-196063 | 7/2003 |
| JP | 2004-054355 | 2/2004 |
| JP | 2005-024817 | 1/2005 |
| JP | 2005-099951 A | 4/2005 |

* cited by examiner

IMAGE FORMING APPARATUS, METHOD OF CONTROLLING SAME AND CONTROL PROGRAM

FIELD OF THE INVENTION

This invention relates to an image forming apparatus, a method of controlling the apparatus and a control program.

BACKGROUND OF THE INVENTION

A conventional image forming apparatus generally has functions for storing image data, which is received from an information generating source such as an information processor or document reader, in an image memory, storing the data in a memory upon appending job types and job sequence on a per-file basis, thereby registering the data as print jobs, launching the print jobs one after another and executing them.

The development of advanced multiple functions in image forming apparatuses such as copiers, facsimile machines and printers in recent years has become conspicuous. Furthermore, various management systems for image forming apparatuses that make it possible for such multifunction image forming apparatuses to be utilized by multiple users via a network have been proposed. In one example of such a system, a personal computer serving as a host and an image forming apparatus are connected via a network such as a LAN so that the image forming apparatus, such as printer, can be shared by these multiple users.

If the advanced multiple functions of the image forming apparatus in such a shared system are capable of being utilized without permission by a third party who is not a sharer (namely an outsider), problems can arise in terms of one's share of expenses for consumables and maintenance. In addition, an increase in running cost cannot be ignored at corporations and workplaces where a number of printers have been installed.

On the other hand, there are occasions where general users want to use printers in public printing systems installed in shops in town. For example, it is convenient if a printer in a public printing system can be used when a user wishes to print a print job that is difficult to print out on a household printer or a voluminous print job that would take too much time to print out on a household printer. The reason for this is that a printer in a public printing system generally has functions more advanced than those of a household printer. In such case the user transmits the data of the print job from his or her own personal computer to the public system via a network. However, in a print system that has been installed in a shop, etc., in town, it is preferable as far as the installer who has installed the system is concerned that such printing not be performed when it comes to collecting the fees for the printing service. Further, as far as the user is concerned, if the printed material is output before the user arrives at the location (such as a convenience store) where the printing system is installed, there is the possibility that another person will pilfer the printout or read its content. Accordingly, what is desirable for both the installer who has installed the system and the user is that the user go to the printing system, make payment of the fee at this location and instruct that the print job be printed upon having his or her identity authenticated.

Accordingly, management methods for restricting free utilization of the image forming apparatus have been proposed. Such methods do not allow a third party to utilize the image forming apparatus by permitting only a sharing user to utilize the apparatus, or execute processing to charge the third party separately.

One known method of managing an image forming apparatus by a fee charging function involves having an administrator set, together with an ID number and password, the number of sheets a user can print in a certain period of time, and denying utilization of the image forming apparatus when the number of printed sheets reaches the number allowed. In another known method involving an image forming apparatus to which a fee collecting device has been connected, a fee is charged in accordance with the image forming operation and images are formed up to the limit of the fee that has been introduced into the fee collecting device (see the specification of Japanese Patent Application Laid-Open No. 10-020957).

One proposed method of performing authentication by a portable storage medium and managing restriction of utilization involves waiting for authentication and placing image formation on standby in a case where an authentication card has not been inserted even though the print job has been accepted. Another method involves discarding a received job in the event that authentication has failed (see the specifications of Japanese Patent Application Laid-Open Nos. 11-305968 and 2000-250730).

Another proposed printing system is equipped with an authentication function for enhancing security and with a charging function for collecting a fee in accordance with utilization of a printing apparatus (see the specification of Japanese Patent Application Laid-Open No. 2001-075751).

However, in an image forming apparatus that is managed by such authentication and charging functions, the apparatus will suspend in mid-course a print job whose execution is in progress if a fee insufficiency occurs during execution of the print job. This gives rise to a problem set forth below.

Specifically, the conventional apparatus is such that if a print job is suspended in mid-course owing to a fee insufficiency, the next user cannot utilize the image forming apparatus and the next waiting job cannot be executed. Accordingly, the print job must be resumed by contacting the administrator or by changing to a sufficiently printable number of sheets as by making an additional payment, or the suspended print job must be deleted or saved.

Furthermore, in a case where a suspended print job is being managed by an authentication function, the command to delete or save the print job must be issued by the printing individual who executed the print job. If the print job is terminated while still in the suspended state, another user cannot utilize the image forming apparatus.

SUMMARY OF THE INVENTION

Accordingly, an object of the present invention is to provide an image forming apparatus in which even in the event that a print job is suspended by reason of an insufficient fee, image formation continues effectively and appropriately.

According to the present invention, the foregoing object is attained by providing an image forming apparatus that charges for image formation processing, comprising: determination means for determining whether or not a fee necessary in order to execute a specified print job has been received; print suspending means for suspending the print job if the determination means has determined that a fee is insufficient; authentication means for authenticating a user during suspension of printing; and printing control means for saving data relating to the suspended print job and accepting a print job from a different user if use of the apparatus by a user identical with the user for which the print job was suspended is not sensed by the authentication means.

Further, according to the present invention, the foregoing object is attained by providing a method of controlling an image forming apparatus that charges for image formation processing, comprising: a determination step of determining whether or not a fee necessary in order to execute a specified print job has been received; a print suspending step of suspending the print job if it has been determined at the determination step that a fee is insufficient; an authentication step of authenticating a user during suspension of printing; and a printing control step of saving data relating to the suspended print job and accepting a print job from a different user if a user identical with the user for which the print job was suspended is not sensed at the authentication step.

Further, according to the present invention, the foregoing object is attained by providing a program for controlling an image forming apparatus that charges for image formation processing, the program causing the apparatus to execute the following steps: a determination step of determining whether or not a fee necessary in order to execute a specified print job has been received; a print suspending step of suspending the print job if it has been determined at the determination step that a fee is insufficient; an authentication step of authenticating a user during suspension of printing; and a printing control step of saving data relating to the suspended print job and accepting a print job from a different user if a user identical with the user for which the print job was suspended is not sensed at the authentication step.

Further, according to the present invention, the foregoing object is attained by providing a storage medium storing a program for controlling an image forming apparatus that charges for image formation processing, the program causing the apparatus to execute the following steps: a determination step of determining whether or not a fee necessary in order to execute a specified print job has been received; a print suspending step of suspending the print job if it has been determined at the determination step that a fee is insufficient; an authentication step of authenticating a user during suspension of printing; and a printing control step of saving data relating to the suspended print job and accepting a print job from a different user if a user identical with the user for which the print job was suspended is not sensed at the authentication step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 3:
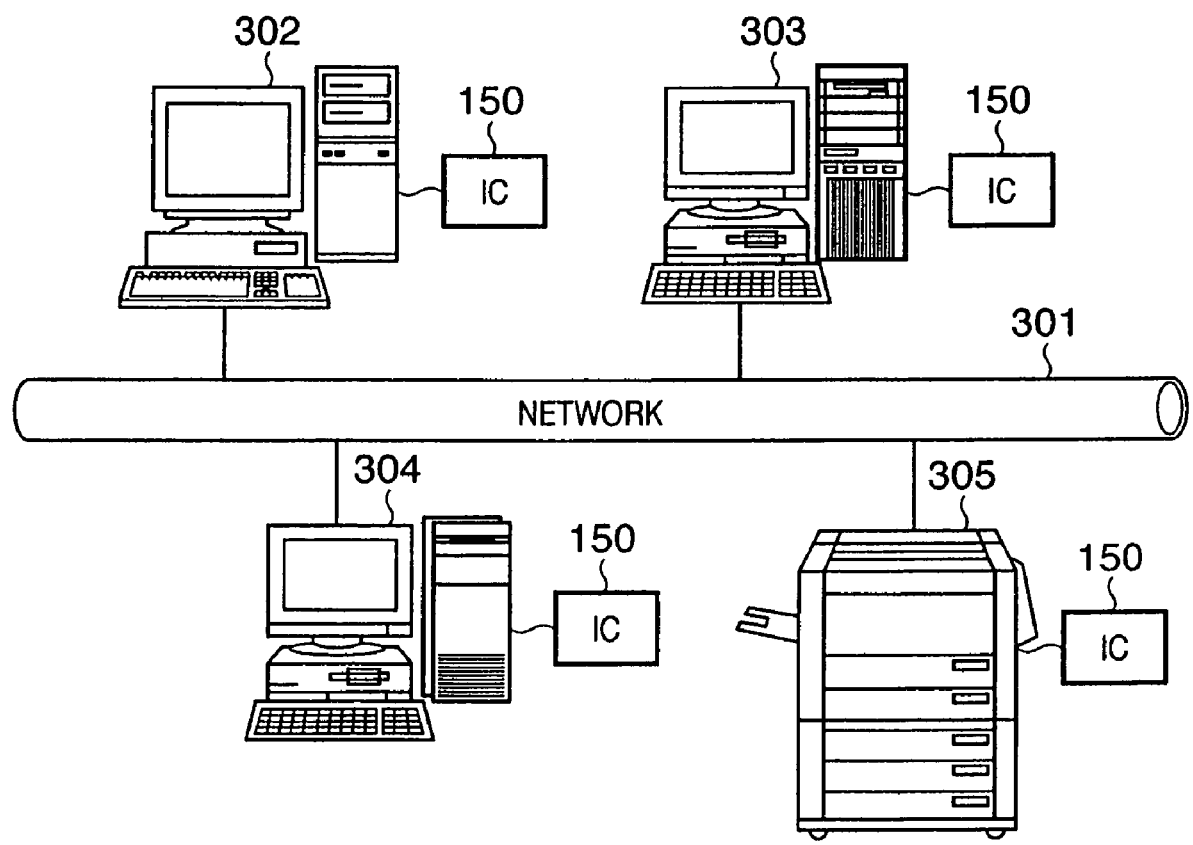
FIG. 3 is a diagram illustrating the configuration of a network that includes a multifunction peripheral according to the first embodiment.

FIG. 3 is a diagram illustrating the configuration of a network to which a multifunction peripheral serving as an image forming apparatus according to a first embodiment of the invention can be applied. A network 301 shown in FIG. 3 supports TCP/IP, by way of example. Client computers 302 and 303 are used by general users. Also connected to the network 301 are an administrative server computer 304 and a multifunction peripheral 305. These devices all have IC-card slots and are capable of reading IC card 150.

By way of example, an electronic document that has been created by an application running on the client computer 302 is transmitted to the multifunction peripheral 305. Upon accepting a print job, the multifunction peripheral 305 does not execute printing immediately but saves the job temporarily. The printing individual proceeds to the front of the multifunction peripheral 305 and inserts the IC card 150. As a result, the result of authentication in an authentication processing unit is validated and printing is started.

The arrangement shown is merely one obtained by using a conceptual drawing to illustrate a general arrangement, and it goes without saying that a plurality of computers and multifunction peripherals may be used by general users. Further, it goes without saying that the peripheral used need not necessarily be a multifunction peripheral; stand-alone devices such as a scanner, printer and facsimile machine may be connected to the network instead. Further, the computers 302 and 303 are personal computers employed in ordinary homes, the computer 304 is a printer server of a public printing system in a convenience store or the like, and the peripheral 305 is a multifunction peripheral of a public printing system in a convenience store or the like.

Figure 1:
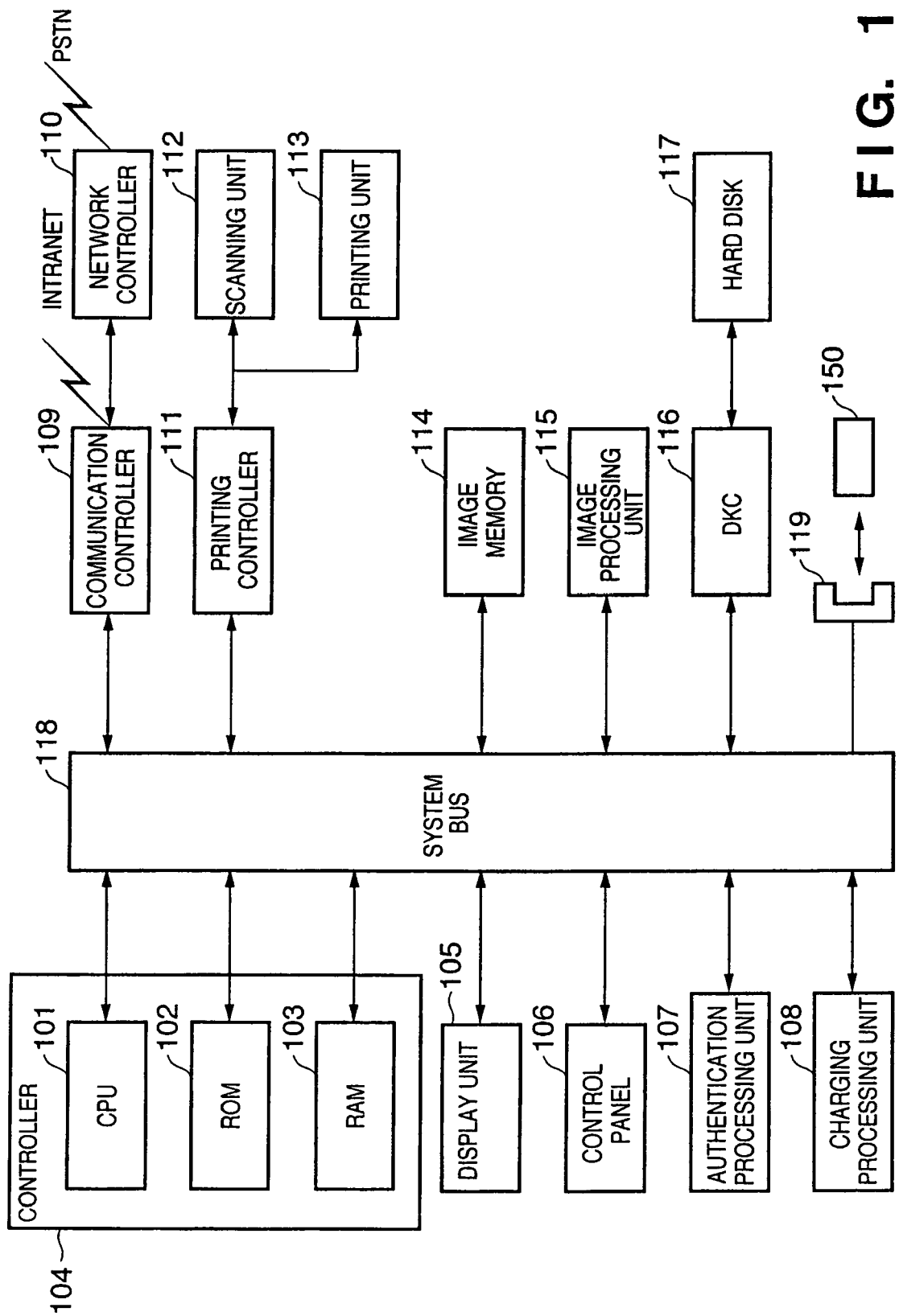
FIG. 1 is a block diagram illustrating the structure of a multifunction peripheral according to a first embodiment of the present invention.

FIG. 1 is a block diagram illustrating the structure of the multifunction peripheral 305 serving as an image forming apparatus according to the first embodiment of the present invention.

The multifunction peripheral 305 includes a controller 104, a display unit 105, a control panel 106, an authentication processing unit 107, a charging processing unit 108 and a system bus 118 connecting these components. The multifunction peripheral 305 is provided with a communication controller 109, a printing controller 111, an image memory 114, an image processing unit 115 and a disk controller (DKT) 116. A network controller 110 is connected to the communication controller 109 via an intranet. A scanning unit 112 and a printing unit 113 are connected to the printing controller 111. A hard disk 117 is connected to the DKC 116.

The controller 104 includes a CPU (Central Processing Unit) 101, a ROM (Read-Only Memory) 102 and a RAM (Random-Access Memory) 103. In accordance with a control program that has been stored on the hard disk 117, the CPU 101 controls the components connected to the system bus 118. The RAM 103 stores various information such as the driving conditions of the components and management data. The RAM 103 also temporarily stores data necessary for operation.

The display unit 105 displays various information such as driving conditions, device status and input information. The control panel 106 comprises keys such as numeric keys and a start key or a touch-sensitive panel, which constitutes part of the display unit 105, for allowing the user to make settings and inputs such as inputs of commands. The authentication processing unit 107, besides performing group and workgroup authentication, executes authentication of print jobs. In accordance with prices that have been decided with regard to a number of services utilized in order to implement printing, the charging processing unit 108 counts the number of sheets used for each service and senses whether or not a charging function is valid.

The communication controller 109, which is connected to an intranet or to the Internet, sends and receives document data, which is inclusive of image data, and control commands. The network controller 110, which is connected to a PSTN (Public Switched Telephone Network), executes prescribed line control at the time of incoming and outgoing calls, thereby connecting or disconnecting a line. Image data and control signals are modulated and demodulated by an internal modem and facsimile transceive is executed via the network controller 110.

The scanning unit 112 reads image data by opto-electronically converting reflected light that conforms to the image of light that has illuminated a document transmitted, copied or saved, and transmits, copies or saves the image data via the printing controller 111. Image data or print data received from an information source such as the scanning unit or client computer is received by the printing unit 113 via the printing controller 111 and is formed as a permanent visible image on printing paper by the printing unit 113. The latter then ejects the printing paper. The image memory 114 temporarily stores the image data or print data read or received. The memory may be inside the hard disk 117 or RAM 103 depending upon the device or status.

The image processing unit 115 subjects data to be transmitted to data compression and encoding and subjects received image data to data decompression and decoding. Further, the image processing unit 115 converts received print data to image data and converts image data to be saved to data of an appropriate format or one specified by the user, such as PDF. The image processing unit 115 further executes image correction processing that conforms to the optical response characteristic of the scanning unit 112 and differences among senders. The image processing unit 115 further executes image manipulation processing such as scaling of an image that the user has input from the control panel 106 and, in response to a request, image optimizing processing for obtaining image data that is suited to the write characteristic, etc., of the printing unit 113. Access to the hard disk 117 is controlled by the disk controller 116.

The system bus 118 connects the CPU 101, ROM 102, RAM 103, controller 104, display unit 105, control panel 106, authentication processing unit 107, charging processing unit 108, communication controller 109, printing controller 111, image memory 114, image processing unit 115 and disk controller 116.

The multifunction peripheral 305 has an IC-card slot 119 into which the IC card 150 possessed by the user is removably inserted.

By virtue of the structure described above, the multifunction peripheral 305 has a facsimile communication function for reading and transmitting image data and for receiving image data. The multifunction peripheral 305 further has a transfer function for transferring image data to a document management server, a copy function for reading and printing out image data, a printer function for receiving print data from a client computer and printing this data; and a scanner function for reading and saving image data. In other words, the multifunction peripheral 305 is capable of being utilized not only as a copier but also as a facsimile machine, printer and scanner.

Identification information such as a department number and a password can be stored on the IC card 150. Identification information and a password can be set in the ROM 102 or hard disk 117 in advance, or identification information and a password that have been transmitted from a user can be stored. The authentication processing unit 107 can make a comparison with the information on the display unit 105 and thus execute authentication.

It goes without saying that the printing unit 113 may employ electrophotographic printing, ink-jet printing, thermal-head printing, dot impact or any other printing method.

By virtue of the structure described above, the charging processing unit 108 functions as determination means for determining whether or not a fee necessary in order to execute a specified print job has been accepted. The authentication processing unit 107 functions as an authentication means for performing user authentication during suspension of printing. The printing controller 111 functions as print suspending means for suspending a print job if it is determined that the fee is insufficient, and as printing control means for saving data relating to the suspended print job and accepting a print job from a different user if use of the apparatus by a user identical with the user for which the print job was suspended is not sensed.

Figure 2:
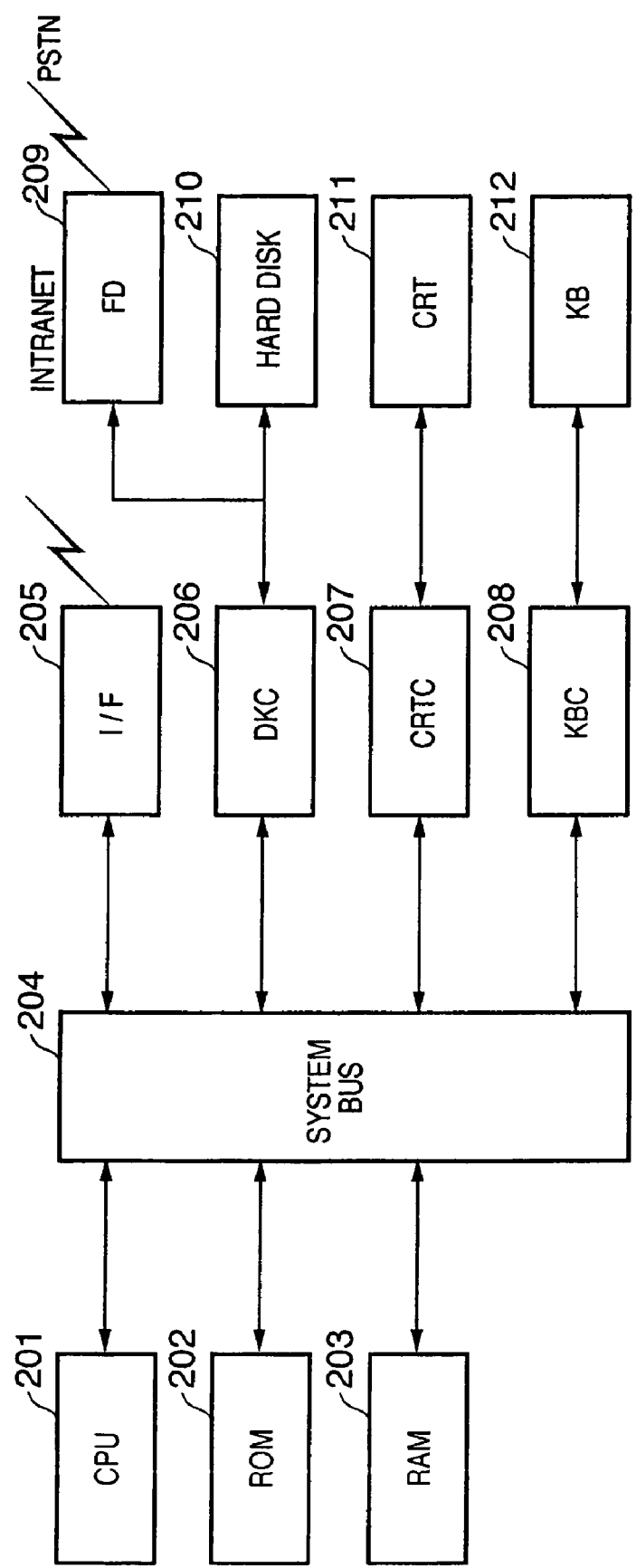
FIG. 2 is a block diagram illustrating the configuration of a client computer that makes use of a multifunction peripheral according to the first embodiment.

FIG. 2 is a block diagram illustrating the structure of the client computers 302 and 303.

As shown in FIG. 2, each of the client computers has a CPU 201 for executing programs and implements overall control of the devices connected to a system bus 204. The programs are stored in a ROM 202 or hard disk 210 or are supplied from a floppy (registered trademark) disk drive (FD) 209.

A RAM 203 functions as a main memory and work area, etc., of the CPU 201. A user-command input controller (KBC) 208 controls commands and inputs from a keyboard (KB) 212 and pointing device (not shown). A CRT controller (CRTC) 207 controls the display presented on a CRT display (CRT) 211. A disk controller (DKC) 206 controls access to the hard disk 210 and floppy disk 209 that store a boot program, various applications, edited files, user files and programs for creating installation programs. A host interface (I/F) 205 exchanges data bidirectionally with local printers, network printers, other network devices or other personal computers.

Figure 4:
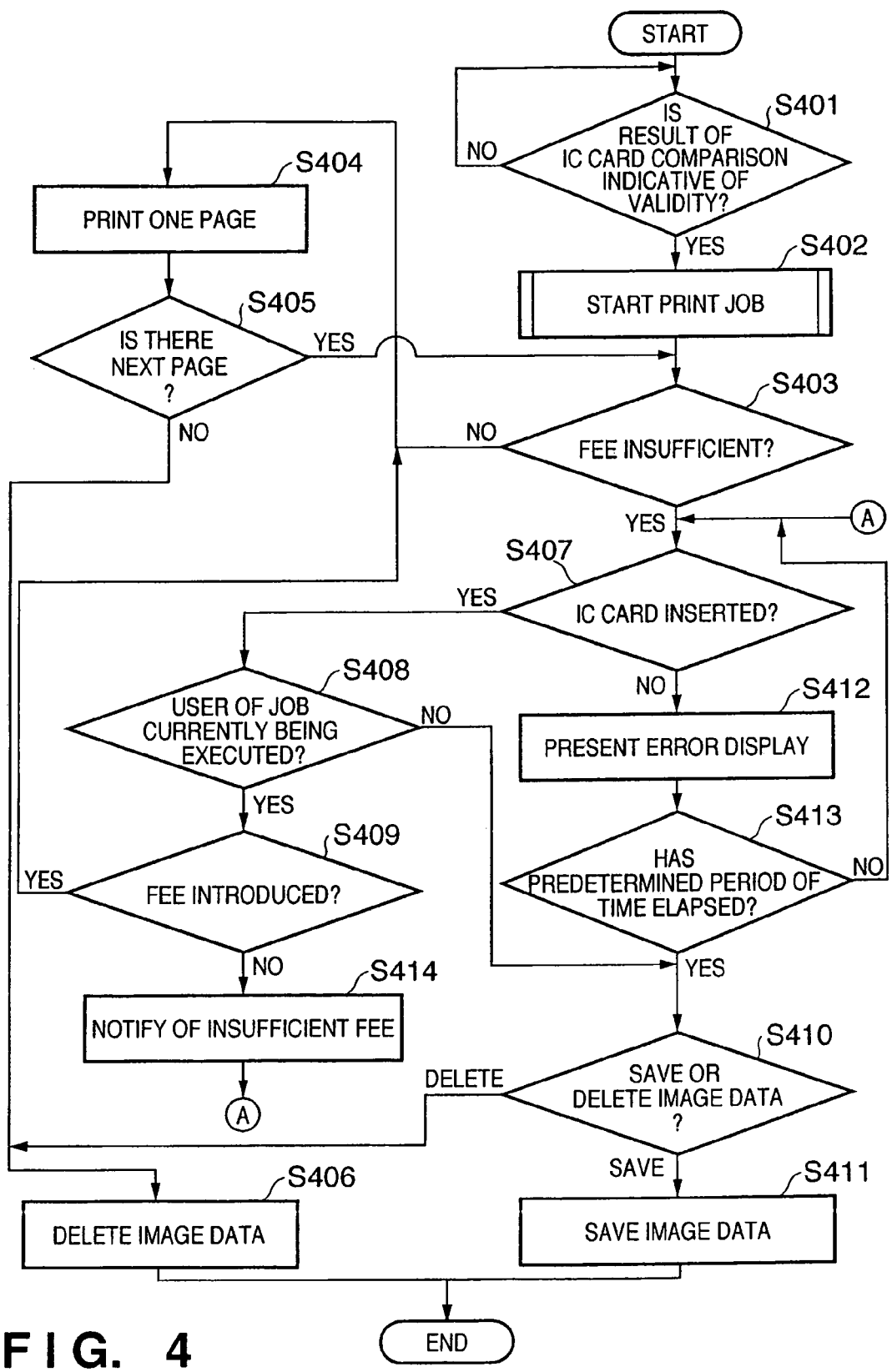
FIG. 4 is a flowchart useful in describing image formation processing in a multifunction peripheral according to the first embodiment.

FIG. 4 is a flowchart illustrating one example of flow of processing for transferring image data according to the first embodiment of the present invention.

First, when the IC card 150 storing identification information is inserted into the IC-card slot 119 of the multifunction peripheral 305, the authentication processing unit 107 compares the identification information on the IC card 150 with identification information already registered on the hard disk 117 and senses whether the IC card 150 is valid or not (step S401). If the IC card 150 is valid, then processing for starting a print job is executed (step S402).

Next, the charging processing unit 108 determines whether the minimum necessary fee for execution of the print job has been paid (step S403). If the fee has been paid, then the first page of the print job is printed by the printing unit 113 (step S404). If there is a following page, then control returns to step S403 and whether or not if a fee insufficiency is determined again. If there is no fee insufficiency, one page of the print job is printed at step S404. This processing is executed repeatedly as long as there is no fee insufficiency. When printout of the final page of the print job ends, then this image data is deleted (step S406).

On the other hand, if the charging processing unit 108 senses payment of an insufficient fee at the start of the print job or during the course of printing, then control proceeds from step S403 to step S407. Printing of the next page is not started and whether a valid IC card 150 has been inserted is sensed by the authentication function.

If the IC card has not been inserted or the result of the comparison is that the card is not valid, i.e., if a valid IC card 150 has not been inserted, then an error display is presented (S412) and the apparatus waits for insertion of the valid IC card 150 until a prescribed period of time passes (S413).

If elapse of the preset time period is sensed without insertion of the valid IC card 150, then control proceeds from step S413 to step S410. Here a selection is made to transfer the image data from the image memory 114 to the hard disk 117 and save it on the hard disk 117 (step S411) or to delete the image data (step S406). Which is executed may be selected using the control panel 106 or may be set in advance. In a case where the image data is transferred from the image memory 114 to the hard disk 117 and stored on the hard disk 117, the user information also is stored on the hard disk 117 together with the image data. If a valid IC card has not been inserted or if no IC card at all has been inserted, then it is judged that the user has withdrawn the IC card. In this case it is construed that the user will settle the balance and that the balance will become zero.

If a valid IC card 150 is inserted within the prescribed period of time, control proceeds from step S407 to step S408. Here the authentication processing unit 107 determines whether the user authenticated from the identification information read from the IC card 150 is the user who specified printing of the print job that has been suspended. If the user of the IC card 150 is the same individual who was the user prior to suspension of the print job, the charging processing unit 108 determines whether a fee sufficient for executing the suspended print job has been introduced (step S409). If the required fee has been introduced, then the suspended print job is resumed (step S404).

The apparatus waits a predetermined period of time for introduction of the sufficient fee at step S409. If it is determined upon elapse of this time that the fee sufficient for executing the print job has not been introduced, the user is notified of fee insufficiency via the display unit 105 (step S414), control returns to step S407 and insertion of the valid IC card 150 is reconfirmed.

If the authentication processing unit 107 determines at step S408 that the user authenticated from the identification information read from the IC card 150 is a new user, namely a person other than the individual who was printing the suspended print job, then control proceeds to step S410. Here the suspended print job is not resumed and the selection is made to transfer the image data from the image memory 114 to the hard disk 117 and save it on the hard disk 117 (step S411) or to delete the image data (step S406). Which is executed may be selected using the control panel 106 or may be set in advance. In a case where the image data is transferred from the image memory 114 to the hard disk 117 and stored on the hard disk 117, the user information also is stored on the hard disk 117 together with the image data.

The period of time the apparatus waits for transfer and saving of the image data or for deletion of the image data can be set be freely by the administrator in advance. Further, the image data transferred may be image data not yet printed out or all pages of the image data constituting the print job.

Figure 5:
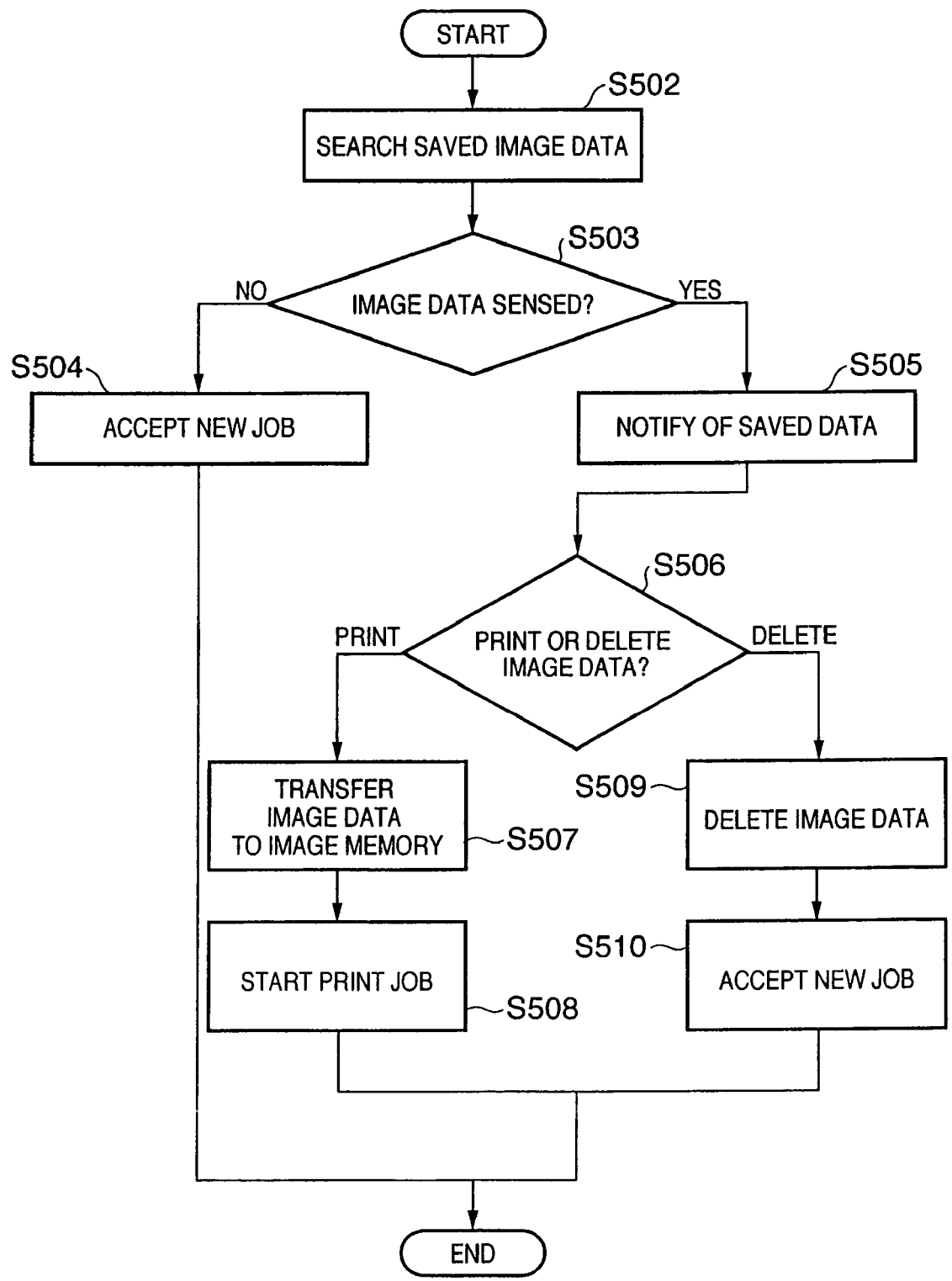
FIG. 5 is a flowchart useful in describing processing for starting a print job in a multifunction peripheral according to the first embodiment.

Next, the details of processing (step S402) for starting a print job will be described with reference to FIG. 5. FIG. 5 is a flowchart illustrating the flow of processing in a case where a valid IC card has been inserted.

When result of comparison of the IC card at step S401 in FIG. 4 is that the card is valid, a search is conducted automatically to determine whether the image data of the print job executed by the authenticated user exists on the hard disk 117 (step S502). Whether image data for which the authenticated user is the printing individual exists (i.e., whether suspended image data exists) is sensed (step S503).

If such data does not exist, a new job is accepted (step S504). In the case of a new job, image data is received from the client computers 302, 303 via the communication controller 109 and is stored in the image memory 114 temporarily, after which the new print job is started by the controller 104.

If it is determined at step S503 that the data does exist, then notification of the fact that saved data exists is given by the display unit 105 (step S505). The apparatus then waits for the user to make a selection using the control panel 106 (step S506). The choices available are deletion and printing.

If printing is selected, control proceeds to step S507, where the image data is transferred from the hard disk 117 to the image memory 114. The print job is then started (step S508). If deletion is selected, on the other hand, then the image data is deleted (step S509) and a new print job is accepted (step S510) just as at step S504. If there is no new print job to be accepted, then processing ends.

Thus, in accordance with this embodiment as described above, the image data of a print job that has been suspended owing to an insufficient fee is saved. This makes it possible for the original user to perform printing again and for a new user to execute a different print job.

The embodiment described above has been illustrated with regard to charging processing when executing printing of image data that has been transferred from the client computers 302, 303 via the communication controller 109 and stored in the image memory 114.

However, the present invention is not limited to such an arrangement. It is possible to execute similar charging processing even in a copying operation, in which image data that has been read from the scanning unit 112 is transmitted to the printing unit 113 via the printing controller 111 and formed on printing paper as a permanent visible image, with the printing paper then being ejected from the apparatus.

Second Embodiment

Figure 6:
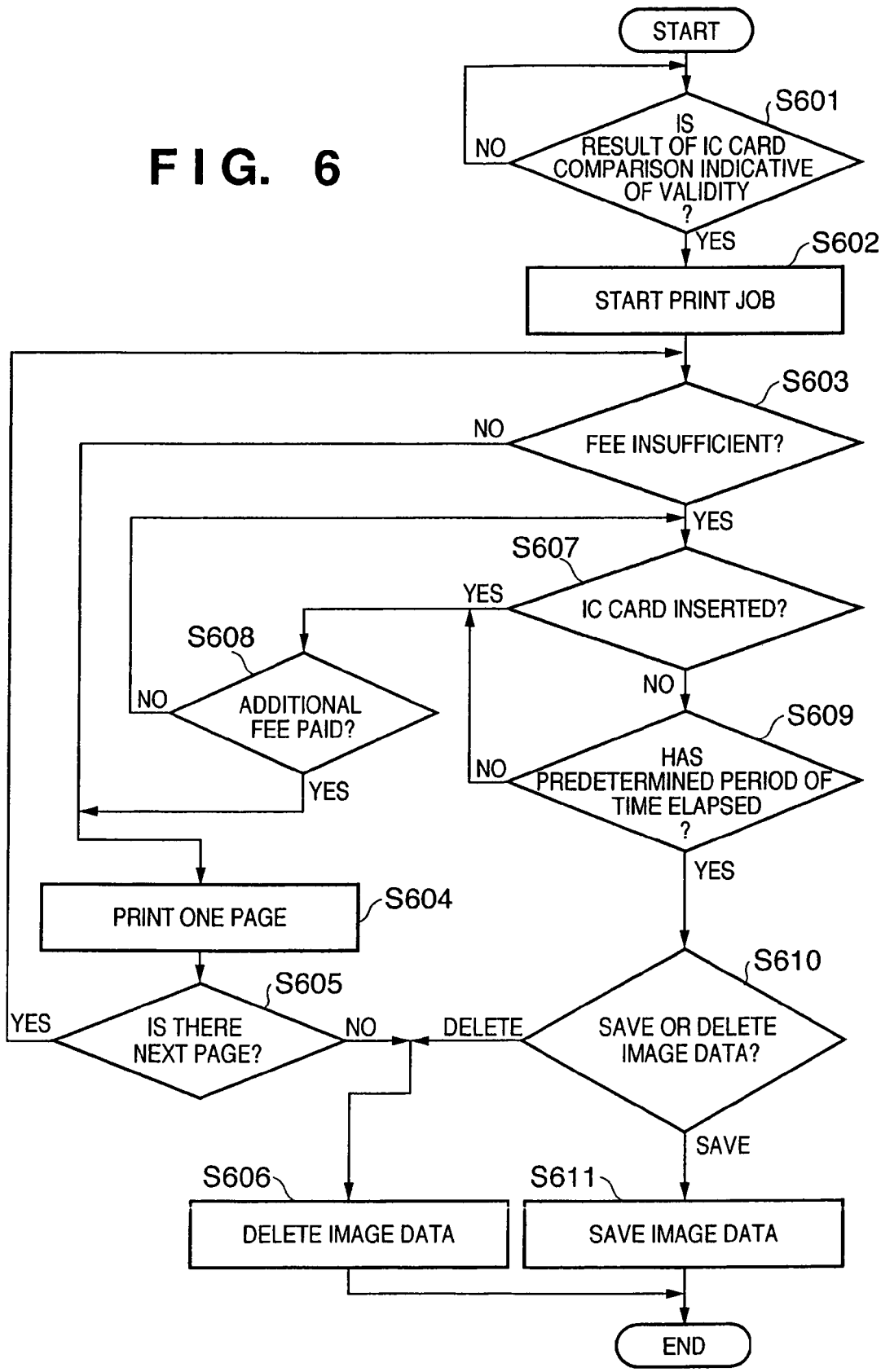
FIG. 6 is a flowchart useful in describing image formation processing according to a second embodiment of the present invention.

FIG. 6 is a flowchart illustrating one example of flow of processing for transferring image data according to a second embodiment of the present invention. Processing and components other than those described in FIG. 6 are similar to those of the first embodiment set forth above. For this reason, components will be identified by like reference characters and need not be described again.

First, when the IC card 150 storing identification information is inserted into the IC-card slot 119 of the multifunction peripheral 305, the authentication processing unit 107 reads and compares the identification information and senses whether the IC card 150 is valid or not (step S601).

If the IC card 150 is valid, then image data that has been transferred from the client computers 302, 303 via the communication controller 109 and stored in the image memory 114 is started up as a print job by the controller 104 (step S602).

Next, the charging processing unit 108 determines whether the minimum necessary fee for execution of the print job has been paid (step S603). If the fee has been paid, then the first page of the print job is printed by the printing unit 113. This processing is repeated from the next page onward. When printout of the final page ends, this image data is deleted (steps S604 to S606).

However, if the charging processing unit 108 determines that the necessary fee has not been paid at the beginning of the print job or during the course of the print job ("YES" at step S603), printing of the next page is not started and the authentication processing unit 107 senses whether the IC card has been inserted and whether the result of comparison is valid or not (step S607).

If the result of comparison is indicative of validity, then the apparatus waits for the charging processing unit 108 to sense that the necessary fee has been paid (step S608).

If it is determined at step S607 that the IC card 150 has not been inserted or that the result of the comparison by the authentication processing unit 107 is not valid, then the apparatus waits a predetermined period time for the charging processing unit 108 to sense that the required fee has been paid (step S609).

If the charging processing unit 108 determines that the required fee has been paid, then printing of the image data is resumed (steps S604 to S606).

If elapse of the preset time period is sensed without introduction of an additional fee and insertion of an IC card (step S610), then printing of image data is not resumed and the image data is transferred from the image memory 114 to the hard disk 117 and saved on the hard disk (step S611) or the image data is deleted (step S606). In the case where the image data is transferred from the image memory 114 to the hard disk 117 and stored, the user information is stored on the hard disk 117 in advance together with the image data. If a valid IC card has not been inserted or if no IC card at all has been inserted, then it is judged that the user has withdrawn the IC card. In this case it is construed that the user will settle the balance and that the balance will become zero.

Which is executed may be selected (step S610) using the control panel 106 or may be set in advance.

The period of time the apparatus waits for transfer and saving of the image data or for deletion of the image data can be set be freely by the administrator in advance.

Further, the image data transferred may be image data not yet printed out or all pages of the image data constituting the print job.

Other Embodiments

In the foregoing embodiments, the image memory 114 is used in a case where a print job is executed and the hard disk 117 is used in a case where image data is saved.

However, the hard disk 117 may be used in a case where a print job is executed and the image memory 114 may be used in a case where the image data is saved. Further, even if a print job is suspended, the image data of the print job may be stored as is, without being transferred, in the memory that was used when the print job was executed. If a new print job is accepted, then the new print job may be executed using another memory.

Further, the foregoing embodiments illustrate a method of transferring data when the printing of image data that has been transferred from a client computer via the communication controller 109 and stored in the image memory 114 is executed.

However, it goes without saying that the image forming apparatus may be one such as a copier that transmits image data read from the scanning unit 112 to the printing unit 113 via the printing controller 111, forms the image represented by the image data on printing paper as a permanent visible image and ejects the printing paper.

In the foregoing embodiments, recognition of identification information and a password is performed using the IC card 150. However, this does not impose a limitation upon the present invention. A department number and password may be input at the control panel 106 and subjected to authentication in the authentication processing unit 107 without using the IC card 150.

The present invention can be applied to a system constituted by a plurality of devices or to an apparatus comprising a single device.

Furthermore, the object of the invention is attained also by supplying a program, which implements the functions of the foregoing embodiments, directly or remotely to a system or apparatus, reading the supplied program codes with a computer of the system or apparatus, and then executing the program codes. Accordingly, since the functions of the present invention are implemented by computer, the program codes per se installed in the computer also fall within the technical scope of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Further, besides the case where the aforesaid functions according to the embodiments are implemented by executing the read program by computer, an operating system or the like running on the computer may perform all or a part of the actual processing so that the functions of the foregoing embodiments can be implemented by this processing.

An object of the present invention is to provide an image forming apparatus in which even in the event that a print job is suspended by reason of an insufficient fee, image formation can continue effectively and appropriately. More specifically, after a print job is suspended, it is possible for another user to utilize the image forming apparatus. It is also possible to re-execute a print job that has been suspended.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-167342, filed Jun. 7, 2005, which is hereby incorporated by reference herein in its entirety.

What is claimed is:

1. An image forming apparatus that charges for execution of a print job, comprising:
   an authentication unit configured to authenticate user information;
   a determination unit configured to determine whether or not a charging processing unit accepts a fee necessary in order to execute a print job which is associated with the user information authenticated by said authentication unit;
   an execution unit configured to execute the print job using data of the print job stored in a first storage area if said determination unit determines that the charging processing unit accepts the fee necessary in order to execute the print job;
   a control unit configured to,
   (i) if said authentication unit authenticates first user information and said determination unit determines that the charging processing unit does not accept a fee necessary in order to execute a first print job which is associated with the first user information, suspend execution of the first print job by said execution unit and hold first data of the first print job in the first storage area until said authentication unit authenticates second user information different from the first user information,
   (ii) if said authentication unit authenticates the second user information while the execution of the first print job is suspended, transfer the first data from the first storage area to a second storage area for saving the first data, accept execution of a second print job which is associated with the second user information to be executed by said execution unit and transfer second data of the accepted second job to the first storage area, and
   (iii) if said authentication unit authenticates the first user information again after the first data is started transferring from the first storage area to the second storage area, transfer the first data from the second storage area to the first storage area and resume suspended execution of the first print job using the first data transferred from the second storage area to the first storage area.

2. The apparatus according to claim 1, further comprising a setting unit configured to set whether or not to transfer a suspended print job;
   wherein said control unit deletes the data relating to the suspended first print job when the user information authenticated by said authentication unit after the first print job has been suspended is different from user information corresponding to the first print job, and it is not set by said setting unit to transfer the suspended print job.

3. The apparatus according to claim 1, wherein said control unit waits a predetermined period of time following suspension of the first print job and resumes the suspended first print job if said determination unit determines that the charging processing unit accepts the fee necessary in order to execute the first print job during the first print job is suspended.

4. The apparatus according to claim 1, wherein said control unit waits a predetermined period of time following suspension of the first print job and transfers the first data relating to the suspended first print job to another storage area if said determination unit determines that the charging processing unit does not accept the fee necessary in order to execute the first print job during the first print job is suspended.

5. The apparatus according to claim 1, further comprising a connecting unit configured to connect to a portable storage medium;
   wherein said authentication unit authenticates the user information by identification information that has been stored on the portable storage medium connected by said connecting unit.

6. The apparatus according to claim 1, wherein said execution unit executes the first print job by using data stored in a first memory, and wherein said control unit transfers the data relating to the suspended first print job to a second memory.

7. A method of controlling an image forming apparatus that charges for execution of a print job, comprising:
   an authentication step of authenticating user information;
   a determination step of determining whether or not a charging processing unit accepts a fee necessary in order to execute a print job which is associated with the user information authenticated in said authentication step;
   an execution step of executing the print job using data of the print job stored in a first storage area if it is determined in said determination step that the charging processing unit accepts the fee necessary in order to execute the print job;
   a control step of,
   (i) if first user information is authenticated in said authentication step and it is determined in said determination step that the charging processing unit does not accept a fee necessary in order to execute a first print job which is associated with the first user information, suspending execution of the first print job in said execution step, and holding first data of the first print job in the first storage area until said authentication step authenticates second user information different from the first user information,
   (ii) if the second user information is authenticated in said authentication step while execution of the first print job is suspended, transferring the first data from the first storage area to a second storage area for saving the data, and accept execution of a second print job which is associated with the second user information to be executed in said execution step, and transferring second data of the accepted second job to the first storage area, and
   (iii) if said authentication step authenticates the first user information again after the first data is started transferring from the first storage area to the second storage area, transferring the first data from the second storage area to the first storage area and resuming suspended execution of the first print job using the first data transferred from the second storage area to the first storage area.

8. A non-transitory computer-readable storage medium storing a program for controlling an image forming apparatus that charges for execution of a print job, said program causing the apparatus to execute the following steps:
   an authentication step of authenticating user information;
   a determination step of determining whether or not a charging processing unit accepts a fee necessary in order to execute a print job which is associated with the user information authenticated in said authentication step;
   an execution step of executing the print job using data of the print job stored in a first storage area if it is determined in said determination step that the charging processing unit accepts the fee necessary in order to execute the print job;

a control step of,
- (i) if first user information is authenticated in said authentication step and it is determined in said determination step that the charging processing unit does not accept a fee necessary in order to execute a first print job which is associated with the first user information, suspending execution of the first print job in said execution step, and holding first data of the first print job in the first storage area until said authentication step authenticates second user information different from the first user information,
- (ii) if the second user information is authenticated in said authentication step while execution of the first print job is suspended, transferring the first data from the first storage area to a second storage area for saving the data, and accept execution of a second print job which is associated with the second user information to be executed in said execution step, and transferring second data of the accepted second job to the first storage area, and
- (iii) if said authentication step authenticates the first user information again after the first data is started transferring from the first storage area to the second storage area, transferring the first data from the second storage area to the first storage area and resuming suspended execution of the first print job using the first data transferred from the second storage area to the first storage area.

* * * * *